R. M. AND H. R. DONALDSON.
CARBURETER ADJUSTER.
APPLICATION FILED FEB. 4, 1919.
1,328,946.
Patented Jan. 27, 1920.
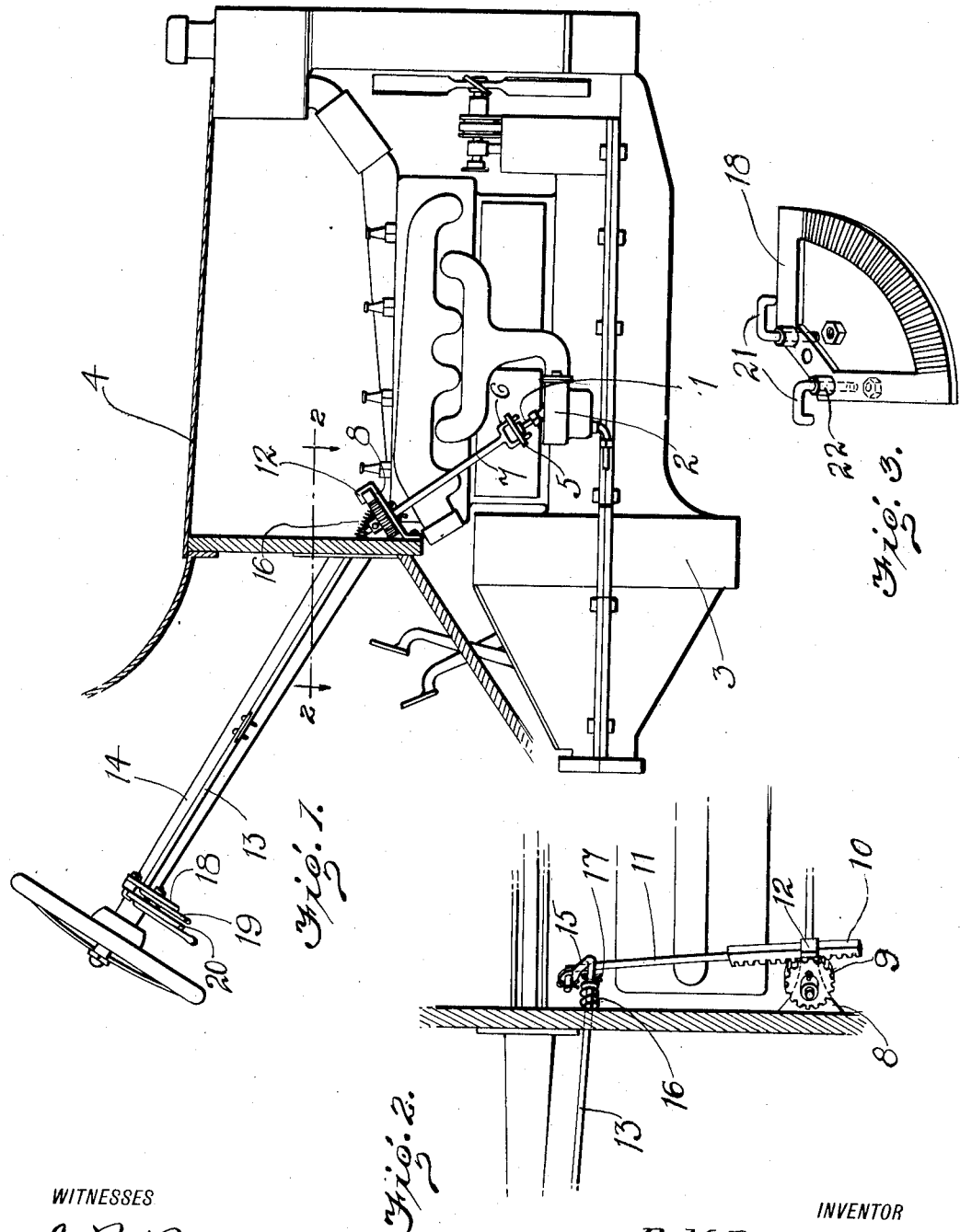

UNITED STATES PATENT OFFICE.

ROBERT M. DONALDSON AND HARRY R. DONALDSON, OF CLAYSVILLE, PENNSYLVANIA.

CARBURETER-ADJUSTER.

1,328,946.   Specification of Letters Patent.   Patented Jan. 27, 1920.

Application filed February 4, 1919. Serial No. 274,880.

*To all whom it may concern:*

Be it known that we, ROBERT M. DONALDSON and HARRY R. DONALDSON, citizens of the United States, and residents of Claysville, in the county of Washington and State of Pennsylvania, have made certain new and useful Improvements in Carbureter-Adjusters, of which the following is a specification.

Our invention is an improvement in carbureter adjusters, especially adapted for use with Ford cars, for permitting the carbureter to be adjusted from the seat, without the necessity of the driver taking his eyes from the road.

Figure 1 is a sectional view through the front of a car showing the car provided with the improvement;

Fig. 2 is a section on the line 2—2 of Fig. 1;

Fig. 3 is a perspective view of the quadrant.

The present embodiment of the invention is shown in connection with the needle valve 1 of the carbureter 2 of the motor 3 of a motor vehicle 4 of usual construction. The needle valve is provided at its upper end with a plate 5 having spaced openings which are engaged by the arms 6 of a fork on a shaft 7. This shaft is journaled at its upper end in a bracket 8, which is secured to the dash board of the vehicle, and the upper end of the shaft is provided with a gear wheel 9 above the bracket. The gear wheel is engaged by a rack bar 10 secured to a link or rod 11, the rack bar being mounted to reciprocate on the bracket and being held in mesh with the gear wheel by an overlying lug 12 on the bracket. A shaft 13 is mounted on the steering column 14 and the said shaft at its rear end extends through the dash board and is provided with an angular arm 15, which is pivoted to an upstanding pin on the adjacent end of the link 11.

A coil spring 16 encircles the shaft between the dash board and a stop 17 in the form of a washer and a cotter pin on the shaft, and normally acts to press the shaft toward the link 11. The upper end of the shaft 13 extends through a quadrant 18 to be described, which is secured to the steering column, and the said upper end has an angular arm or handle 19 above the quadrant for convenience in manipulating the shaft. The quadrant shown more particularly in Fig. 3, is connected to quadrant 20 found on such machines, by means of hooked bolts 21. These bolts are passed through the quadrant and through spacing collars 22, which may be connected with the quadrant and engage over the quadrant 20 to secure the quadrant 18 in place on the quadrant 20.

The handle 19 is adapted to engage the teeth of the quadrant 18 to hold the shaft 13 in adjusted position, and the spring 16 provides sufficient resiliency to permit the disengagement of the handle when lifted and to insure its engagement when released.

Referring to Fig. 1 it will be noticed that the shaft 13 is sectional, consisting of two sections connected by a lap joint, and by bolts as shown.

In operation, the extent of valve opening, that is the adjustment of the carbureter 2, may be controlled from the handle 19. In order to save fuel, reduce carbon deposits, prevent overheating and secure a smooth running motor, the carbureter requires frequent adjustment. The driver cannot use the regular dash adjustment, and obtain the right adjustment without taking his eyes from the road. Hence the adjustment is not changed as often as it should be because of the inconvenience. Inexperienced drivers are aided in adjusting the carbureter with the improvement.

We claim:—

1. In a motor vehicle, an operating means for permitting the needle valve of the carbureter to be operated from a distance, said means comprising a pair of shafts arranged with their ends adjacent, the remote end of one shaft being connected with the valve to turn the same, the connection between the adjacent ends of the shafts comprising a pinion on one shaft, a lateral arm on the other and a rack bar pivoted to the arm and engaging the pinion.

2. In a motor vehicle, an operating means for permitting the needle valve of the carbureter to be operated from a distance, said means comprising a pair of shafts arranged with their ends adjacent, the remote end of one shaft being connected with the valve to turn the same, the connection between the adjacent ends of the shafts comprising a pinion on one shaft, a lateral arm on the other and a rack bar pivoted to the arm and engaging the pinion, and means for connecting the remote end of the last named shaft to the steering post of the vehicle, said means comprising a toothed quadrant, the lever having a handle for engaging the teeth of the quadrant and being journaled in the quadrant, said quadrant having hooked bolts for engaging the control arm quadrant to secure the first named quadrant thereto.

ROBERT M. DONALDSON.
HARRY R. DONALDSON.

Witnesses:
GEO. B. SPROWLS,
MARY M. BLAYNEY.